(12) United States Patent
Chang et al.

(10) Patent No.: US 12,075,462 B2
(45) Date of Patent: Aug. 27, 2024

(54) WIRELESS DEVICE FOR ACHIEVING LOW LATENCY TRANSMISSION OF TIME-SENSITIVE DATA

(71) Applicant: Realtek Semiconductor Corp., HsinChu (TW)

(72) Inventors: Chung-Yao Chang, HsinChu (TW); Chuan-Hu Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/847,198

(22) Filed: Jun. 23, 2022

(65) Prior Publication Data

US 2023/0189327 A1 Jun. 15, 2023

(30) Foreign Application Priority Data

Dec. 15, 2021 (TW) .................................. 110146851

(51) Int. Cl.
*H04W 72/12* (2023.01)
*H04L 47/56* (2022.01)
*H04L 47/62* (2022.01)
*H04W 72/566* (2023.01)

(52) U.S. Cl.
CPC ........... *H04W 72/569* (2023.01); *H04L 47/56* (2013.01); *H04L 47/6215* (2013.01)

(58) Field of Classification Search
None
See application file for complete search history.

(56) References Cited

U.S. PATENT DOCUMENTS

2021/0075675 A1* 3/2021 Cavalcanti .......... H04L 41/0823
2021/0288915 A1* 9/2021 Venkatesan .......... H04L 47/622

* cited by examiner

*Primary Examiner* — Kouroush Mohebbi
(74) *Attorney, Agent, or Firm* — Winston Hsu

(57) ABSTRACT

A wireless device includes a time-sensitive queue, an access category queue, a controller, and a transmitter. The access category queue is associated with an access category and a link. The controller is coupled to the access category queue, and is used to acquire a transmission opportunity according to a set of contention parameters of the access category. The transmitter is coupled to the controller and the time-sensitive queue, and is used to when a transmission opportunity is acquired, if the time-sensitive queue contains data, generate a data frame according to the data in the time-sensitive queue, and transmit the data to another wireless device via a link.

10 Claims, 5 Drawing Sheets

WIRELESS DEVICE FOR ACHIEVING LOW LATENCY TRANSMISSION OF TIME-SENSITIVE DATA

BACKGROUND OF THE INVENTION

1. Field of the Invention

The invention relates to a wireless network, and in particular, to a wireless device for achieving stable, reliable, and low-latency transmission of time-sensitive data.

2. Description of the Prior Art

IEEE 802.11be standard specifies communication protocols of wireless access technologies for the new generation of Wi-Fi 7, supporting multi-link multi-radio (MLMR), 320 MHz bandwidth, 4096-quadrature amplitude modulation (QAM), and 16 spatial streams to achieve high speed rate, providing enhanced user experience. As the demand for low latency in gaming applications such as virtual reality, augmented reality, real-time gaming continues to rise, it becomes crucial for a wireless device to provide stable, reliable and low-latency transmission for time-sensitive data.

SUMMARY OF THE INVENTION

According to an embodiment of the invention, a wireless device includes a time-sensitive queue, a first category queue, a first controller, and a first transmitter. The first category queue is associated with a first access category and a first link. The first controller is coupled to the first category queue, and is used to obtain a first transmission opportunity of the first access type according to a first set of contention parameters of the first access category. The first transmitter is coupled to the first controller and the time-sensitive queue. When the first transmission opportunity is obtained, if the time-sensitive queue contains data, the first transmitter is used to generate a first data frame according to the data from the time-sensitive queue, and transmit the first data frame to another wireless device via the first link.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
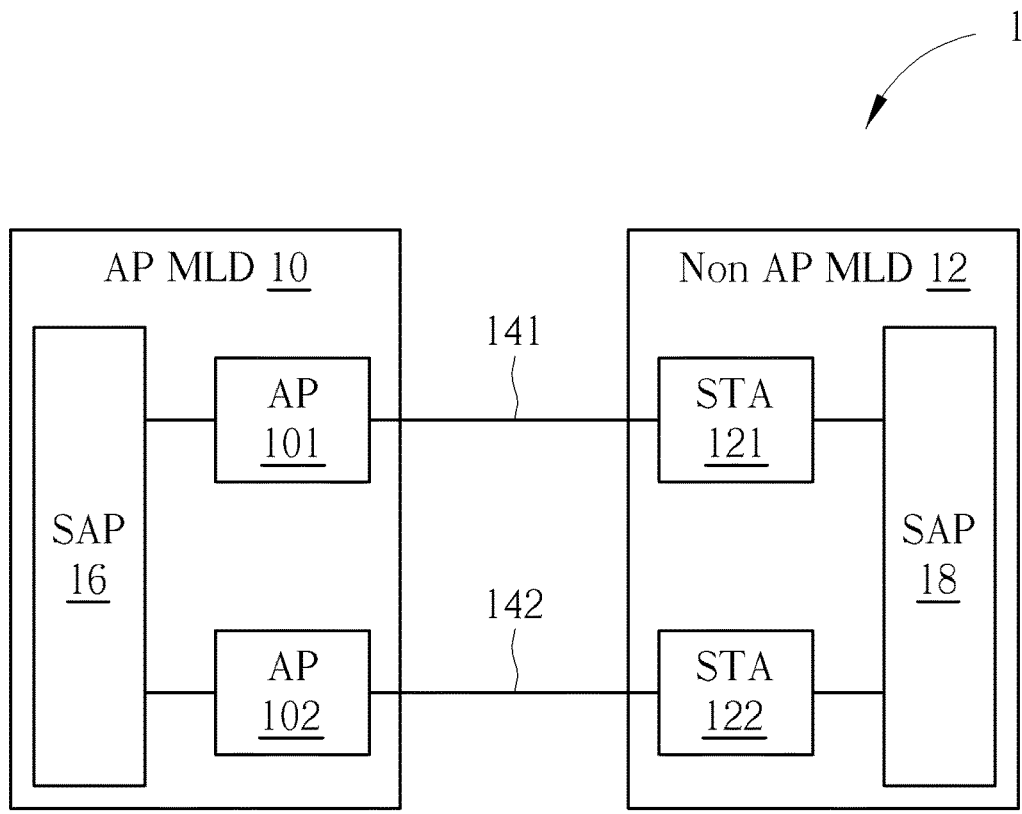
FIG. 1 is a schematic diagram of a multi-link communication system according to an embodiment of the invention.

FIG. 1 is a schematic diagram of a multi-link communication system 1 according to an embodiment of the invention. The multi-link communication system 1 includes an access point multi-link device (AP MLD) 10 and a non-access point multi-link device (non-AP MLD) 12. The multi-link communication system 1 is compatible with IEEE 802.11be communication protocol.

The AP MLD 10 includes access points (AP) 101 and 102, and a service access point (SAP) 16, and the non-AP MLD 12 includes stations (STA) 121 and 122, and a SAP 18. The SAP 16 may perform a data conversion between the logical link control (LLC) layer and a lower layer thereof in the AP MLD 10, and the SAP 18 may perform a data conversion between the LLC layer and a lower layer thereof in the non-AP MLD 12. The AP 101, the AP 102, the SAP 16, the STA 121, the STA 122, and the SAP 18 may be logical devices, and may be implemented by hardware, software, firmware, or a combination thereof. The AP MLD 10 and the non-AP MLD 12 may establish links 141 and 142 therebetween. For example, the AP 101 may communicate with the STA 121 via the link 141, and the AP 102 may communicate with the STA 122 via the link 142. The link 141 may be established using a channel in the 2.4 GHz, 5 GHz or 6 GHz band, the link 142 may established using another channel in the 2.4 GHz, 5 GHz or 6 GHz band different from that of the link 141. For example, the link 141 may operate in a channel in the 2.4 GHz band, and the link 142 may be operated in a channel in the 5 GHz band.

Figure 2:
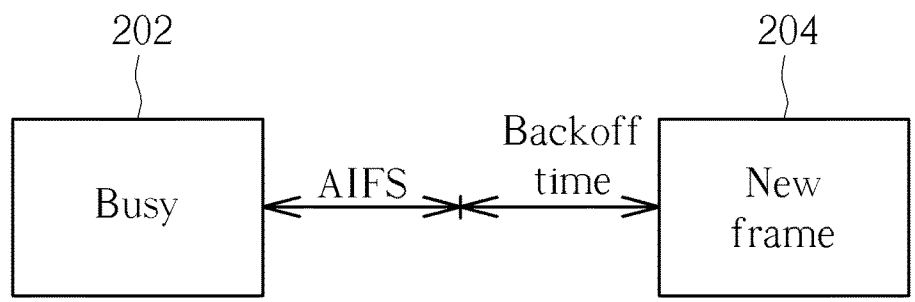
FIG. 2 is a timing diagram of an enhanced distributed channel access (EDCA) mechanism based on carrier detection multiple access/collision avoidance.

The STA 121 and STA 122 may adopt a carrier sense multiple access/collision avoidance (CSMA/CA) mechanism with a contention window and random backoff mechanism to gain access to the transmission medium. IEEE 802.11 protocol employs an enhanced distributed channel access (EDCA) mechanism to ensure quality of service (QoS). FIG. 2 shows the timing diagram of the EDCA mechanism based on CSMA/CA. In order to avoid collisions, prior to sending a new frame, the STA 121 and STA 122 will determine whether the channel is idle during an arbitration inter-frame space (AIFS). If data is being transmitted in the channel, the STA 121 and STA 122 will detect that the transmission medium is busy (202). If the channel is idle, the stations 121, 122 will wait for a random backoff time before sending a new frame 204.

The EDCA mechanism defines 4 access categories (AC), namely background (BK), best effort (BE), video (VI), and voice (VO). The 4 ACs compete with each other to obtain a transmission opportunity (TXOP) in the transmission medium. The access category is associated with a length of the AIFS and a length of the backoff time. In general, the length of the AIFS and the length of the backoff time of the access categories VO, VI, BE, and BK increase in sequence. Details of how to obtain the length of the AIFS and the length of the backoff time will be explained in the subsequent paragraphs. The data of the access categories VO, VI, BE, and BK may be associated with priorities as defined in the EDCA mechanism. High priority data may be defined by the AP MLD 10 or the non-AP MLD 12, and is referred to as time-sensitive data. For example, A_VO (Alternative VO) with higher priority is added for time-sensitive data VO, and VO and A_VO to share a set of random backoff contention-based access mechanism. Further, A_VI (Alternative VI) with higher priority is added for time-sensitive data VI, and VI and A_VI to share a set of random backoff contention-based access mechanism. The priority of the time-sensitive data may be higher than the priorities of the access categories VO, VI, BE, and BK defined in the EDCA mechanism. The non-AP MLD 12 may provide low latency transmission services for the time-sensitive data, so as to enhance transmission reliability and reduce data latency.

Figure 3:
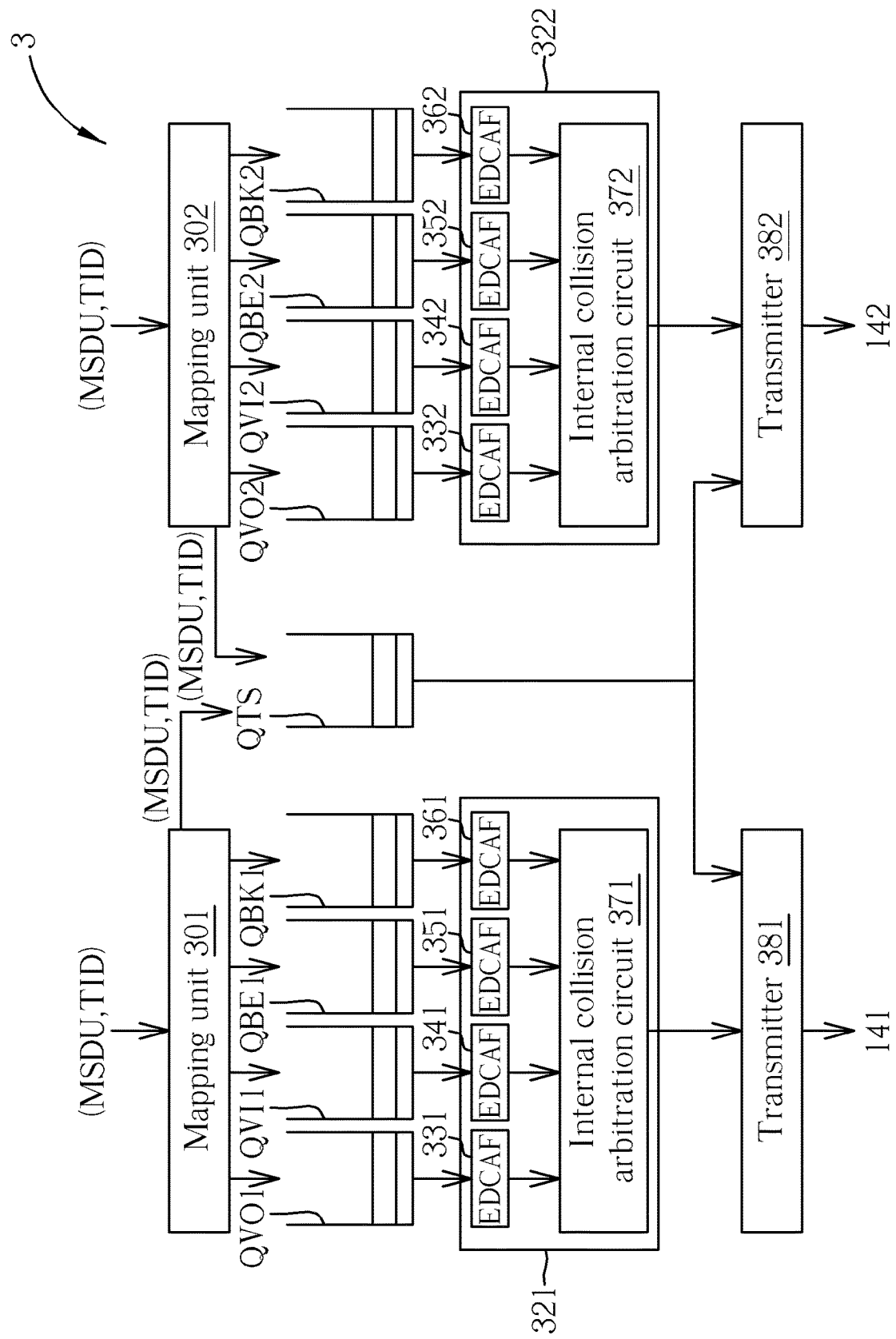
FIG. 3 is a schematic diagram of a delay optimization architecture of a wireless device using the EDCA mechanism according to an embodiment of the invention.

FIG. 3 is a schematic diagram of a delay optimization architecture 3 of a wireless device using the EDCA mechanism according to an embodiment of the invention. The wireless device may be the AP MLD 10 and/or the non-AP MLD 12 in FIG. 1. In the following paragraphs, the AP MLD 10 will be used to explain the operations of the wireless device in the present invention. However, those skilled in the art may modify the delay optimization architecture 3 based on similar principles of the present invention for use in the non-AP MLD 12. The delay optimization architecture 3 may be implemented by hardware, software, firmware, or a combination thereof. The delay optimization architecture 3 may receive media access control (MAC) service data unit (MSDU) from the LLC layer. Once one of the access categories VO, VI, BE, and BK obtains a transmission opportunity, the time-sensitive MSDU may be transmitted to the non-AP MLD 12 via the links 141 and/or 142, so as to increase the throughput and reduce the delay of the time-sensitive data. Further, if the AP MLD 10 obtains the transmission opportunities of the links 141 and 142 simultaneously, the delay optimization architecture 3 may duplicately transmit the time-sensitive MSDU to the non-AP MLD 12 via the links 141 and 142, so as to enhance the transmission reliability and reduce the number of retransmissions of the time-sensitive data.

The delay optimization architecture 3 includes a time-sensitive queue QTS, mapping units 301 and 302, category queues QVO1, QVI1, QBE1, QBK1, QVO2, QVI2, QBE2, QBK2, controllers 321 and 322, and transmitters 381 and 382. The time-sensitive queue QTS and the category queues QVO1, QVI1, QBE1, QBK1, QVO2, QVI2, QBE2, QBK2 may be first-in-first-out (FIFO) queues. The time-sensitive queue QTS is a low-latency queue independent of the category queues QVO1, QVI1, QBE1, QBK1, QVO2, QVI2, QBE2, and QBK2.

The mapping unit 301, the category queues QVO1, QVI1, QBE1, QBK1, the controller 321, and the transmitter 381 may be associated with the link 141. The mapping unit 301 may be coupled to the category queues QVO1, QVI1, QBE1, QBK1 and the time-sensitive queue QTS, the category queues QVO1, QVI1, QBE1, QBK1 may be coupled to the controller 321, and the controller 321 may be coupled to the transmitter 381. Similarly, the mapping unit 302, the category queues QVO2, QVI2, QBE2, QBK2, the controller 322, and the transmitter 382 may be associated with the link 142. The mapping unit 302 may be coupled to the category queues QVO2, QVI2, QBE2, QBK2 and the time-sensitive queue QTS, the category queues QVO2, QVI2, QBE2, QBK2 may be coupled to the controller 322, and the controller 322 may be coupled to the transmitter 382. The time-sensitive queue QTS may be shared by the links 141 and 142.

Each of the category queues QVO1, QVI1, QBE1, QBK1, QVO2, QVI2, QBE2, QBK2 may be associated with a predetermined access category. For example, the category queues QVO1 and QVO2 may be associated with the access category VO and may buffer data of the access category VO, the category queues QVI1 and QVI2 may be associated with the access category VI and may buffer data of the access category VI, the category queues QBE1 and QBE2 may be associated with the access category BE and may buffer data of the access category BE, and the category queues QBK1 and QBK2 may be associated with the access category BK and may buffer data of the access category BK. The wireless device may define the priority of a traffic stream (TS) according to the traffic demand. For example, the non-AP MLD 12 may transmit an ADDTS request to the AP MLD 10 for adding a self-defined QoS type according to the traffic demand, the ADDTS request containing a traffic specification (TSPEC) including parameters of the requested TS. For example, the TSPEC in the ADDTS request may include a service interval, a data delay associated with a throughput, a data direction as being uplink, downlink or bidirectional, and a user priority (UP). The non-AP MLD 12 may set the time-sensitive TS by setting the UP of the requested TS to be higher than the access categories defined in the EDCA mechanism. The AP MLD 10 may transmit an ADDTS response to the non-AP MLD 12 in response to an ADDTS request. The ADDTS response may include a TSPEC containing a traffic stream identifier (TSID) and a corresponding UP. The TSID includes 4 bits, with the most significant bit (MSB) always being set to "1", and consequently, the valid values of the TSID are 8 to 15, and 8 types of TS may be defined at most. Further, each MSDU may contain QoS control information including a traffic identifier (TID). The TID has 4 bits with the valid values ranging from 0 to 15. When the TID is a value between 0 and 7, the QoS control information is associated with the 8 traffic categories (TC) defined by the EDCA mechanism. When the TID is a value between 8 and 15, the QoS control information is associated with a TS category defined by the non-AP MLD 12, that is, the TID is equal to the TSID in the TSPEC in the ADDTS response. In some embodiments, the AP multi-link device 10 may record the self-defined TS and the AC defined by the EDCA mechanism and the corresponding TIDs, as shown in Table 1:

TABLE 1

| Priority | UP | AC or TS | TID |
|---|---|---|---|
| lowest | 1 | BK | 1 |
|  | 2 | BK | 2 |
|  | 0 | BE | 0 |
|  | 3 | BE | 3 |
|  | 4 | A_VI | 4 |
|  | 5 | VI | 5 |
|  | 6 | VO | 6 |
| Highest | 7 | A_VO | 7 |
|  | 0~7 | TS1 | 8 |
|  | 0~7 | TS2 | 9 |
|  | 0~7 | TS3 | 10 |
|  | 0~7 | TS4 | 11 |

As shown in Table 1, TIDs from 0 to 7 may be associated with the four access categories AC defined by the EDCA mechanism, and TIDs from 8 to 11 may be associated with self-defined traffic streams TS1 to TS4. The mapping unit 301 may receive the MSDU and the corresponding TID from the LLC layer, and use Table 1 to determine which one of the AC or TS the MSDU belongs to according to the corresponding TID, and assign the MSDU to one of the category queues QVO1, QVI1, QBE1, QBK1 and the time-sensitive queue QTS accordingly. For example, if the TID of the MSDU is 6, the mapping unit 301 may determine that the MSDU belongs to the access category VO, and assign the MSDU to the category queue QVO1. If the TID of the MSDU is 11, the mapping unit 301 may determine that the MSDU belongs to the traffic stream TS4 and is a time-sensitive MSDU, and assign the MSDU to the time-sensitive queue QTS. In some embodiments, if the mapping unit 301 determines that the MSDU is time-sensitive, the time-sensitive MSDU is assigned to the time-sensitive queue QTS. For example, all time-sensitive MSDUs of the traffic streams TS1 to TS4 are assigned to the time-sensitive queue QTS. In other embodiments, the time-sensitive queue QTS includes a plurality of sub-time-sensitive queues, and if the mapping unit 301 determines that the MSDU is time-sensitive, the mapping unit 301 transmits the time-sensitive MSDU and the TID thereof to one in the plurality of sub-time-sensitive queues. Each sub-time-sensitive queue may store the time-sensitive MSDU according to the TID. For example, the first sub-time-sensitive queue may store time-sensitive MSDUs with a TID of 8, and the second sub-time-sensitive queue may store time-sensitive MSDUs with a TID of 9.

The controller 321 may obtain a transmission opportunity of transmitting data of each access category on the link 141 according to a set of contention parameters of each access category. The access categories VO, VI, BE, and BK may correspond to 4 sets of contention parameters, respectively, and each set of contention parameters may include a minimum contention window CWmin[AC], a maximum contention window CWmax[AC], and the number of AIFS AIFSN[AC] as shown in Table 2:

TABLE 2

| AC | Cwmin[AC] | Cwmax[AC] | AIFSN[AC] |
|----|-----------|-----------|-----------|
| BK | aCWmin | aCWmax | 7 |
| BE | aCWmin | aCWmax | 3 |
| VI | (aCWmin + 1)/2 − 1 | aCWmin | 2 |
| VO | (aCWmin + 1)/4 − 1 | (aCWmin + 1)/2 − 1 | 2 | where Cwmin[AC] is the minimum contention window of the access category (AC);

Cwmax[AC] is the maximum contention window of the access category (AC), aCWmax is greater than aCWmin; and AIFSN[AC] is the number of arbitration inter-frame spaces of the access category (AC), expressed in the number of time slots.

The backoff time of each access category may be randomly selected from a range between the minimum contention window CWmin[AC] and the maximum contention window CWmax[AC]. For example, the backoff time of the access category BK may be randomly selected from a range between aCWmin and aCWmax. The AIFS of each access category may be computed according to Equation (1) using the number of AIFS AIFSN[AC]. For example, the AIFS of the access category BK may be (7aSlotTime+aSIFSTime).

$$AIFS[AC]=AIFSN[AC] \times aSlotTime+aSIFSTime \quad \text{Equation (1)}$$

where AIFS[AC] is the arbitration inter-frame space of the access category AC;

AIFSN[AC] is the number of the arbitration inter-frame spaces of the access category AC;

aSlotTime is a slot time; and aSIFSTime is a short inter-frame space (SIFS) Time.

According to Equation (1), when AIFSN[AC] is smaller, and/or Cwmin[AC]/Cwmax[AC] is smaller, the priority is higher and the probability of obtaining transmission opportunities is higher, corresponding to better service quality. Table 2 shows that the respective AIFSN[AC] of access categories VO, VI, BE, and BK increase sequentially, and the respective Cwmin[AC]/Cwmax[AC] also increase sequentially, and consequently, the priorities of the four access categories from high to low are the access categories VO, VI, BE, and BK.

The controller 321 may include enhanced distributed channel access functions (EDCAF) 331 to 361 and an internal collision arbitration circuit 371. The EDCAF 331 to 361 may respectively correspond to the access categories VO, VI, BE, and BK, and may be respectively coupled to the category queues QVO1, QVI1, QBE1, QBK1, and may be coupled to the internal collision arbitration circuit 371. The internal collision arbitration circuit 371 may be coupled to the transmitter 381. The EDCAF 331 to 361 may respectively generate AIFS and backoff times for access categories VO, VI, BE, and BK. Each EDCAF 331 to 361 may include a AFIS timer and a backoff timer thereof. When only one of the AFIS timers and the backoff timers of the EDCAF 331 to 361 expires, the corresponding access category may obtain the transmission opportunity of the link 141. When two or more of the AFIS timers and the backoff timers of the EDCAF 331 to 361 expire simultaneously, the internal collision arbitration circuit 371 may determine which access category can obtain a transmission opportunity of the link 141 according to the priorities defined in Table 1 (column 1). For example, if the AFIS timers and backoff timers of EDCAF 331 and 361 expire simultaneously, since Table 1 shows that the priority of the access category VO is higher than the priority of the access category BK, the access category VO will obtain the transmission opportunity of the link 141.

When one EDCAF obtains a transmission opportunity, the EDCAF may detect the statuses of the corresponding category queue and the time-sensitive queue QTS. If the time-sensitive queue QTS contains data and/or the corresponding category queue contains data, the transmitter 381 may generate a data frame according to the data in the time-sensitive queue QTS and/or the corresponding category queue, and transmit the data frame to the non-AP MLD 12 via the link 141.

Figure 4:
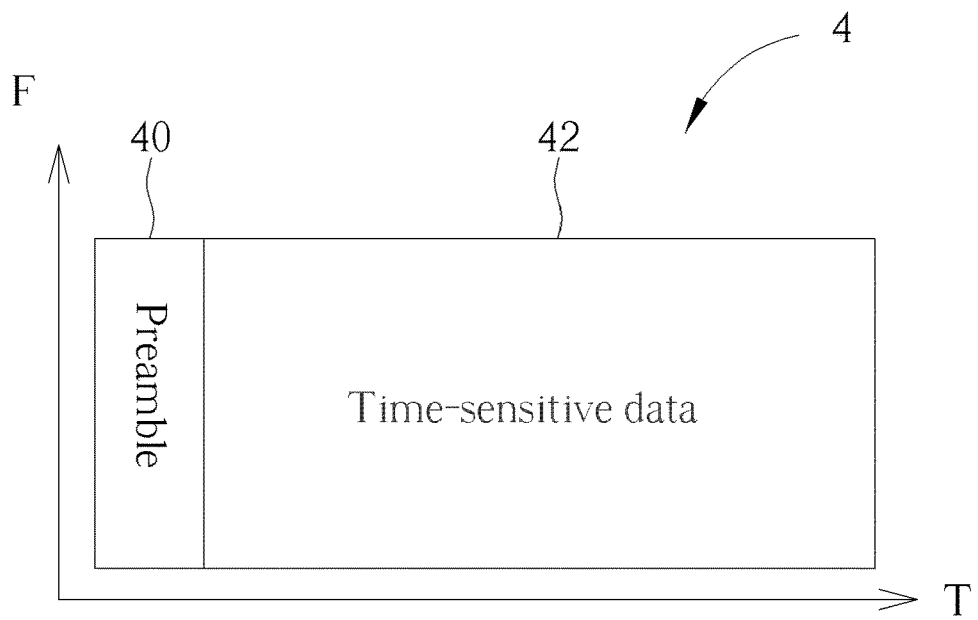
FIG. 4 is a schematic diagram of a data frame according to an embodiment of the invention.

In some embodiments, if the time-sensitive queue QTS contains data and the category queue of the access category obtaining the transmission opportunity contains no data, the data frame will contain the data from the time-sensitive queue QTS but not the data of the access category obtaining the transmission opportunity, and may be a non-orthogonal frequency-division multiple access (non-OFDMA) frame, as shown by the data frame 4 in FIG. 4. The transmitter 381 may transmit the data frame 4 to the non-AP MLD 12 via the link 141 using the non-OFDMA mode. For example, if the access category VO obtains a transmission opportunity, and the EDCAF 331 detects that the time-sensitive queue QTS contains data and the category queue QVO1 contains no data, the data frame generated by the transmitter 381 may include data from the time-sensitive queue QTS but not the data from the access category VO. FIG. 4 is a schematic diagram of a data frame 4 according to an embodiment of the invention, where the horizontal axis represents time T, and the vertical axis represents frequency F. The data frame 4 may include a preamble 40 and a time-sensitive data 42. The time-sensitive data 42 may be data in the time-sensitive queue QTS.

Figure 5:
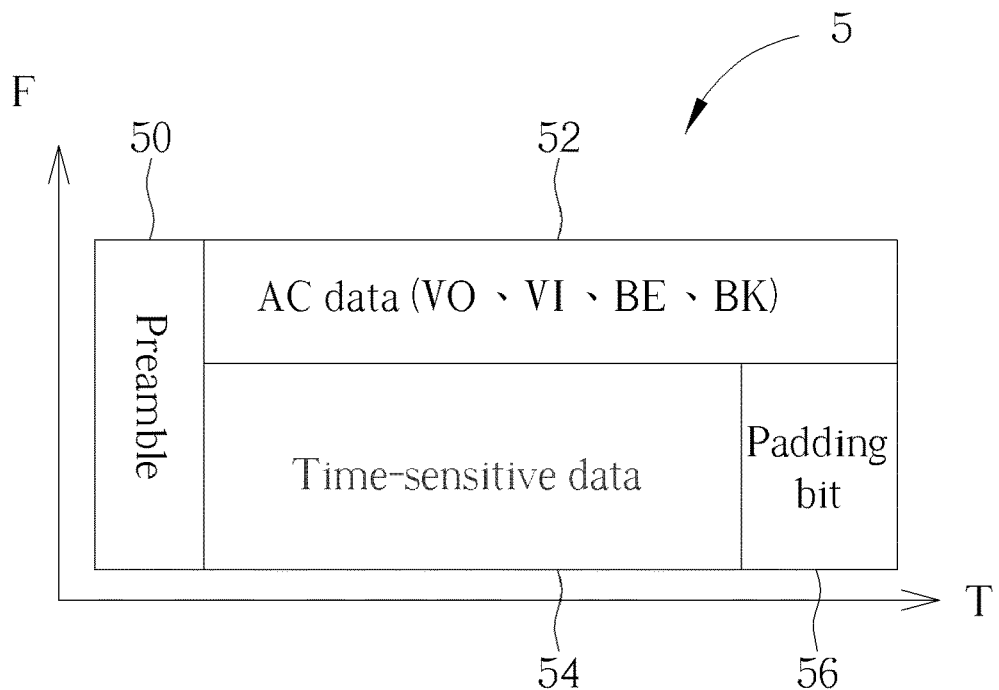
FIG. 5 is a schematic diagram of a data frame according to another embodiment of the invention.

In other embodiments, if the time-sensitive queue QTS contains data and the category queue corresponding to EDCAF contains data, the transmitter 381 may allocate a first resource unit (RU) of the data frame to the data of the access category obtaining the transmission opportunity, and allocate a second resource unit of the data frame to the data from the time-sensitive queue QTS. The transmitter 381 may load the data of the access category obtaining the transmission opportunity to the first resource unit, and load the data from the time-sensitive queue QTS to the second resource unit, so as to transmit the data frame to the non-AP MLD 12 via the link 141. The data frame contains the data from the time-sensitive queue QTS and the data from the category queue obtaining the transmission opportunity, and may be an orthogonal frequency-division multiple access (OFDMA) frame, as shown by the data frame 5 in FIG. 5. The transmitter 381 may transmit the data frame 5 to the non-AP MLD 12 via the link 141 using an OFDMA mode. For example, if the access category VO obtains a transmission opportunity, the EDCAF 331 detects that the time-sensitive queue QTS contains data and the category queue QVO1 contains data, then the data frame generated by the transmitter 381 may include the data from the time-sensitive queue QTS and the data from the category queue QVO1. The transmitter 381 may load the data from the category queue QVO1 to the first resource unit, and load the data from the time-sensitive queue QTS to the second resource unit to transmit the data frame 5 in the OFDMA mode. FIG. 5 is a schematic diagram of a data frame 5 according to another embodiment of the invention, where the horizontal axis represents time T, and the vertical axis represents frequency F. The data frame 5 may include a preamble 50, AC data 52, time-sensitive data 54 and padding bits 56. The AC data 52 may be data of the access category obtaining the transmission opportunity and may be transmitted on the first resource unit. The time-sensitive data 54 may be data from the time-sensitive queue QTS and may be transmitted on the second resource unit.

In other embodiments, if there is the time-sensitive queue QTS contains no data and the category queue of the access category obtaining the transmission opportunity contains data, then the data frame contains the data from the access category obtaining the transmission opportunity but not data from the time-sensitive queue QTS, and may be a non-OFDMA frame. The transmitter 381 may transmit the data frame to the non-AP MLD 12 via the link 141 in the non-OFDMA mode. For example, if the access category VO obtains a transmission opportunity, and the EDCAF 331 detects that the time-sensitive queue QTS contains no data and the category queue QVO1 contains data, the data frame generated by the transmitter 381 may include the data from the category queue QVO1 but not time-sensitive data. The data frame may be similar to the data frame 4 in FIG. 4, except that the time-sensitive data 42 is replaced with the data from the category queue QVO1.

In other embodiments, if the time-sensitive queue QTS contains no data and the category queue of the access category obtaining the transmission opportunity contains no data, the transmitter 381 need not transmit any data frame.

The category queues QVO2, QVI2, QBE2, QBK2, the controller 322, and the transmitter 382 may obtain a transmission opportunity of the link 142. The controller 322 may include EDCAFs 332 to 362 and an internal collision arbitration circuit 372. The EDCAF 332 to 362 may be respectively coupled to the category queues QVO2, QVI2, QBE2, QBK2, and may be coupled to the internal collision arbitration circuit 372. The internal collision arbitration circuit 372 may be coupled to the transmitter 382. The operation principle and circuit configuration of the mapping unit 302, the category queue QVO2, QVI2, QBE2, QBK2, the controller 322, and the transmitter 382 are similar to those of the mapping unit 301, the category queue QVO1, QVI1, QBE1, QBK1, the controller 311, and the transmitter 381, and explanation therefor will be omitted here for brevity.

In some embodiments, the controller 321 may obtain the first transmission opportunity of a first access category according to a first set of contention parameters of the first access category, and the controller 322 may obtain a second transmission opportunity of a second access category according to a second set of contention parameters of the second access category. If the time-sensitive queue QTS contains data, the transmitter 381 may generate a first data frame according to the data from the time-sensitive queue QTS, and transmit the first data frame to the STA 121 of the non-AP MLD 12 via the link 141, and the transmitter 382 may generate a second data frame according to the data from the time-sensitive queue QTS, and transmit the second data frame to the STA 122 of the non-AP MLD 12 via the link 142. For example, the first access category may be the access category VO, and the second access category may be the access category BK. The controller 321 may obtain the first transmission opportunity of the access category VO according to the first set of contention parameters of the access category VO, the controller 322 may obtain the second transmission opportunity of the access category BK according to the second set of contention parameters of the access category BK. If the time-sensitive queue QTS contains data, the transmitter 381 may generate a first data frame according to the data from the time-sensitive queue QTS, and transmit the first data frame to the STA 121 of the non-AP MLD 12 via the link 141, and the transmitter 382 may generate a second data frame according to the data from the time-sensitive queue QTS, and transmit the second data frame to the STA 122 of the non-AP MLD 12 via the link 142.

In other embodiments, the controller 321 may obtain the first transmission opportunity of a first access category according to a first set of contention parameters of the first access category, and the controller 322 may obtain a second transmission opportunity of the first access category according to the first set of contention parameters of the first access category. If the time-sensitive queue QTS contains data, the transmitter 381 may generate a first data frame according to the data from the time-sensitive queue QTS, and transmit the first data frame to the STA 121 of the non-AP MLD 12 via the link 141, and the transmitter 382 may generate a second data frame according to the data from the time-sensitive queue QTS, and transmit the second data frame to the STA 122 of the non-AP MLD 12 via the link 142. For example, the first access category may be the access category VO, the controller 321 may obtain the first transmission opportunity of the access category VO according to the first set of contention parameters of the access category VO, the controller 322 may obtain the second transmission opportunity of the access category VO according to the first set of contention parameters of the access category VO. If the time-sensitive queue QTS contains data, the transmitter 381 may generate a first data frame according to the data from the time-sensitive queue QTS, and transmit the first data frame to the STA 121 of the non-AP MLD 12 via the link 141, and the transmitter 382 may generate a second data frame according to the data from the time-sensitive queue QTS, and transmit the second data frame to the STA 122 of the non-AP MLD 12 via the link 142.

Since the time-sensitive queue QTS is shared by the links 141 and 142, so long as one access category obtains a transmission opportunity of the link 141 or 142, the data from the time-sensitive queue QTS may be transmitted to the non-AP MLD 12 via the link 141 or 142, increasing the throughput of the time-sensitive data. Further, since the time-sensitive queue QTS is independent of the category queue QVO1, QVI1, QBE1, QBK1, QVO2, QVI2, QBE2, QBK2, and is not attached to any EDCAF 331 to 361, 332 to 362, when any access category obtains a transmission opportunity, the wireless device may transmit the data from the time-sensitive queue QTS. In this way, the transmission opportunity of time-sensitive data is increased, and the delay of time-sensitive data is effectively reduced.

While the delay optimization architecture 3 in FIG. 3 only adopt two links, those skilled in the art would recognize that the delay optimization architecture 3 may be modified for other numbers of links based on the principle of the present invention. For example, the category queues QVO2, QVI2, QBE2, QBK2, the controller 322, and the transmitter 382 may be removed from the delay optimization architecture 3 in a single-link system. In another embodiment, another set of category queues, a controller, and a transmitter may be added to the delay optimization architecture 3, and the time-sensitive queue QTS may be coupled to the newly added transmitter for use by a three-link system.

In addition, while each link of the delay optimization architecture 3 in FIG. 3 is only associated with 4 category queues, the number of category queues is not limited to 4, those skilled in the art may modify the delay optimization architecture 3 based on the principle of the present invention to provide other numbers of category queues.

Figure 6:
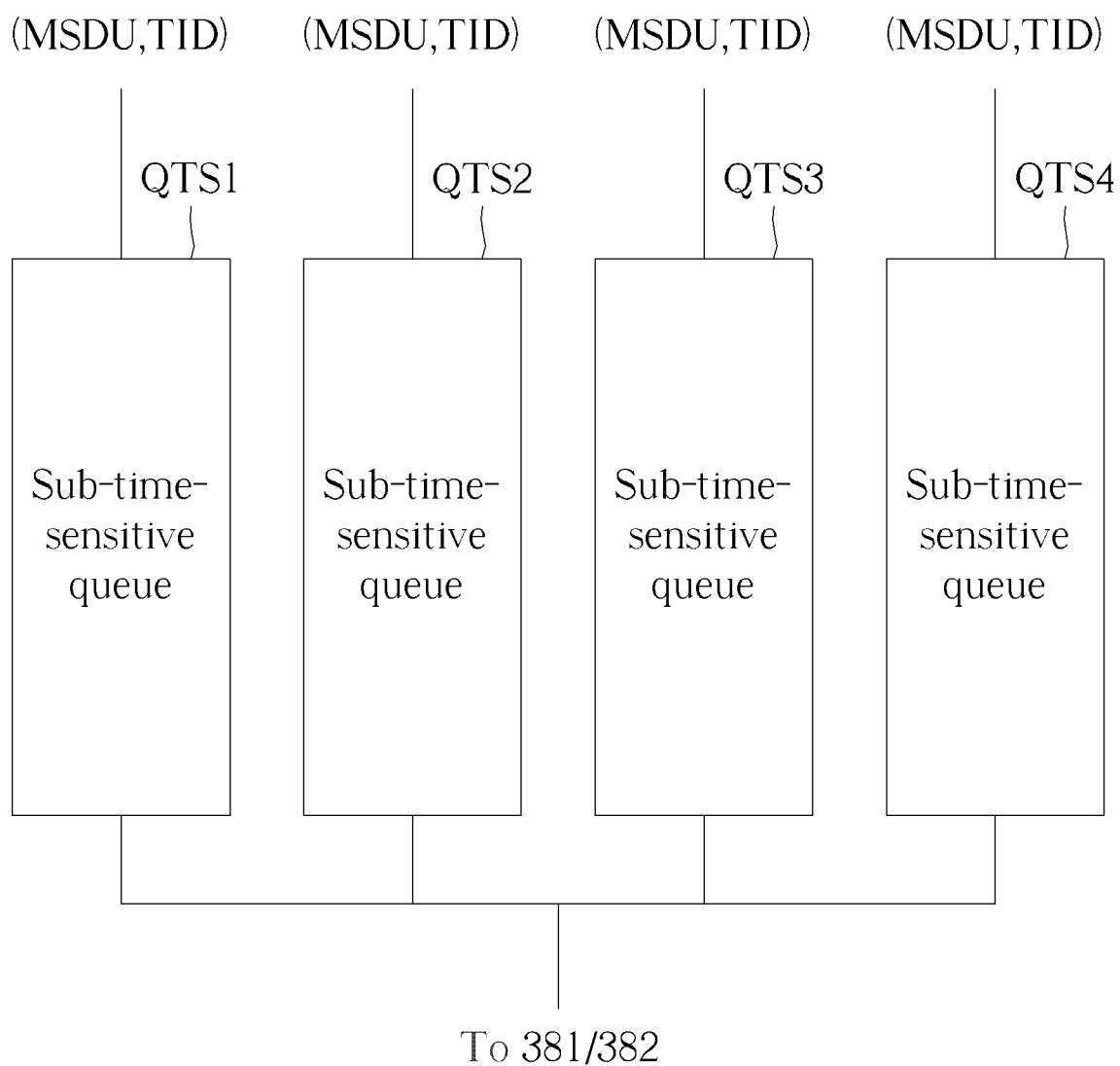
FIG. 6 is a schematic diagram of a time-sensitive queue in FIG. 3.

FIG. 6 is a schematic diagram of the time-sensitive queue QTS in FIG. 3. The time-sensitive queue QTS includes sub-time-sensitive queues QTS1 to QTS4, corresponding to the transmission streams TS1 to TS4, respectively. The sub-time-sensitive queues QTS1 to QTS4 may be coupled to the transmitters 381 and 382. The sub-time-sensitive queues QTS1 to QTS4 may receive a time-sensitive MSDU and a TID, and the TID is a positive integer ranging from 8 to 11. The sub-time-sensitive queues QTS1 to QTS4 may buffer the time-sensitive MSDUs of different TSs, respectively. For example, when time-sensitive MSDU and a TID are received and the TID is 8, the sub-time-sensitive queue QTS1 may buffer the time-sensitive MSDU of the transmission stream TS1. When time-sensitive MSDU and a TID are received and the TID is 9, the sub-time-sensitive queue QTS2 may buffer the time-sensitive MSDU of the transmission stream TS2. When time-sensitive MSDU and a TID are received and the TID is 10, the sub-time-sensitive queue QTS3 may buffer the time-sensitive MSDU of the transmission stream TS3. When time-sensitive MSDU and a TID is received MSDU and the TID is 11, the sub-time-sensitive queue QTS4 may buffer the time-sensitive MSDU of the transmission stream TS4. When one of the category queues QVO1, QVI1, QBE1, and QBK1 obtains the first transmission opportunity and/or one of the category queues QVO2, QVI2, QBE2, and QBK2 obtains the second transmission opportunity, if at least one of the sub-time-sensitive queues QTS1 to QTS4 contains data, the transmitter 381 may generate a first data frame according to the data from the at least one of the sub-time-sensitive queues QTS1 to QTS4 and transmit the first data frame to the STA 121, and/or the transmitter 382 may generate a second data frame according to the data from the at least one of the sub-time-sensitive queues QTS1 to QTS4 and transmit the second data frame to the STA 122. While FIG. 6 shows that the time-sensitive queue QTS includes 4 sub-time-sensitive queues, the time-sensitive queue QTS may be implemented by other numbers of sub-time-sensitive queues. In some embodiments, data sent to the sub-time-sensitive queues may be sorted according to TSIDs.

Figure 7:
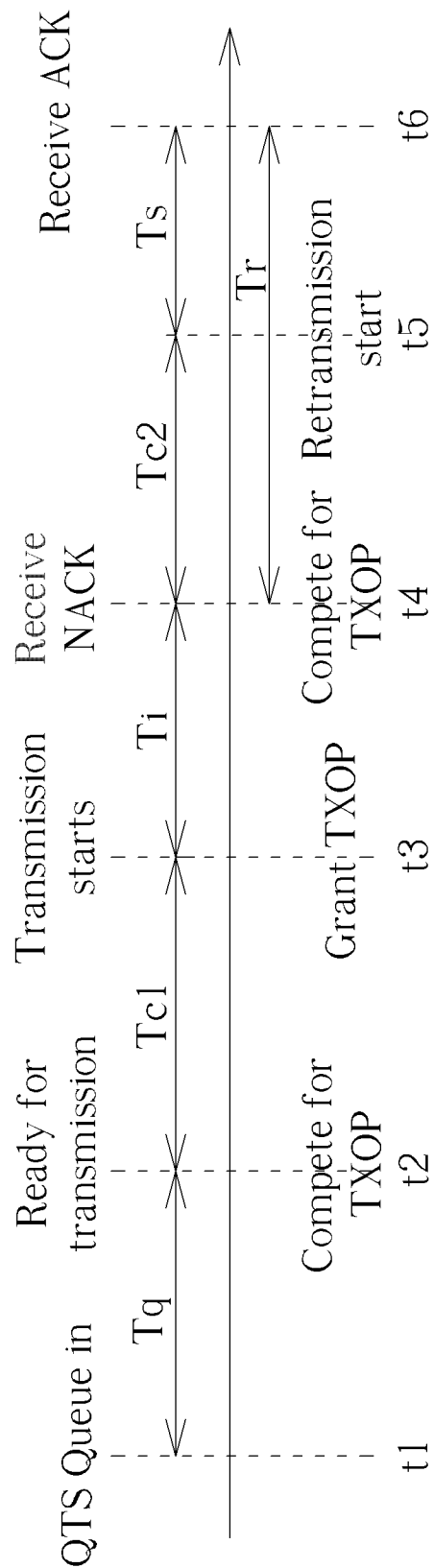
FIG. 7 is a schematic diagram of transmission delays of a wireless device according to an embodiment of the invention.

FIG. 7 is a schematic diagram of transmission delays of a wireless device according to an embodiment of the invention.

At Time t1, the time-sensitive data is input to the time-sensitive queue QTS. At Time t2, the time-sensitive data is ready to be output from the time-sensitive queue QTS. The interval between Time t1 and Time t2 may be referred to as a queue delay Tq, representing the time from entering the queue (queue in) until being ready for transmission (queue out) of the time-sensitive data. The TSID is used for sorting data to the time-sensitive queues, and it is not shared with the access category queue, leading to an effective reduction in the queue delay.

At Time t2, the access categories VO, VI, BE, and BK start to compete for a transmission opportunity. At Time t3, one of the access categories VO, VI, BE, and BK obtains the transmission opportunity. The interval between Time t2 and Time t3 may be referred to as the channel access delay Tc1, representing the time for the data of the access category VO, VI, BE, or BK to be granted with the transmission opportunity (grant TXOP). The channel access delay Tc1 is associated with the corresponding set of contention parameters of the access category VO, VI, BE, or BK. Since the time-sensitive data need not compete for transmission opportunities and uses the transmission opportunity obtained by one of the access categories VO, VI, BE, and BK for transmission, the channel access delay Tc1 of the time-sensitive data is reduced significantly.

At Time t4, the wireless device receives a negative acknowledgment (NACK) message for the data transmission, indicating that the transmission has failed, and the access categories VO, VI, BE, and BK need to re-compete for a transmission opportunity. The interval between Time t3 and Time t4 may be referred to as an initial transmission delay Ti, representing the time from the start of transmission to the transmission failure. At Time t5, one of the access categories VO, VI, BE, and BK obtains the transmission opportunity, and the time-sensitive data may be transmitted again using the transmission opportunity of one of the access categories VO, VI, BE, and BK. The interval between Time t4 and Time t5 may be referred to as a channel access delay Tc2. At Time t6, the wireless device receives an acknowledgment (ACK) message for the data transmission, indicating that the transmission has succeeded. The interval between Time t5 and Time t6 may be referred to as a transmission delay Ts. The interval between Time t4 and Time t6 may be referred to as a retransmission delay Tr, representing the time from the transmission failure to the transmission success, and is equal to the sum of the channel access delay Tc2 and the transmission delay Ts (Tr=Tc2+Ts). When the transmission fails and the backoff flow is re-started, the channel access delay Tc2 will increases exponentially, resulting in the retransmission delay Tr increasing exponentially.

Since the time-sensitive queue QTS is shared by the links 141 and 142, if the links 141 and 142 obtain transmission opportunities at the same time, the time-sensitive data may be duplicated and transmitted on the links 141 and 142 simultaneously. The transmission of the same time-sensitive data through the links 141 and 142 will increase the transmission reliability and increase the probability of a successful transmission, thereby reducing the retransmission delay Tr. In addition, since the time-sensitive queue QTS is shared by the links 141 and 142, when the transmission fails and the time-sensitive data needs to be retransmitted, it may be transmitted via the transmission opportunity obtained by the original transmission link or the access category of other links, effectively reducing the channel access delay Tc2 during the retransmission, and reducing the retransmission delay Tr.

The embodiment in FIG. 3 to FIG. 6 introduces an independent time-sensitive queue QTS, utilizing the characteristics of multi-link and OFDMA transmission technology to achieve delay optimization and enhance transmission reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless device comprising:
a time-sensitive queue for receiving time-sensitive data;
a first category queue associated with a first link and for receiving data of a first access category;
a first controller coupled to the first category queue, configured to obtain a first transmission opportunity of the first access category according to a first set of contention parameters of the first access category; and
a first transmitter coupled to the first controller and the time-sensitive queue, wherein when the first transmission opportunity is obtained by the first access category while the time-sensitive data does not compete with the first category for the first transmission opportunity, if the time-sensitive queue contains the time-sensitive data, the first transmitter is configured to generate a first data frame containing the time-sensitive data from the time-sensitive queue, and transmit the first data frame to another wireless device by using the first transmission opportunity via the first link.

2. The wireless device of claim 1, wherein if the time-sensitive queue contains the time-sensitive data and the first category queue contains no data, the first data frame includes the time-sensitive data from the time-sensitive queue without including data of the first access category.

3. The wireless device of claim 1, wherein if the time-sensitive queue contains the time-sensitive data and the first category queue contains data of the first access category, the first transmitter is configured to allocate a first resource unit (RU) of the first data frame to the data of the first access category from the first category queue, and allocate a second RU of the first data frame to the time-sensitive data from the time-sensitive queue.

4. The wireless device of claim 1, further comprising:
a second category queue associated with a second access category and a second link, the second link being different from the first link;
a second controller coupled to the second category queue, and configured to obtain a second transmission opportunity of the second access category according to a second set of contention parameters of the second access category; and
a second transmitter coupled to the second controller and the time-sensitive queue, and when the second transmission opportunity is obtained, if the time-sensitive queue contains the time-sensitive data, configured to generate a second data frame according to the time-sensitive data from the time-sensitive queue, and transmit the second data frame to the another wireless device via the second link.

5. The wireless device of claim 1, further comprising:
a second category queue associated with the first access category and a second link, the second link being different from the first link;
a second controller coupled to the second category queue, and configured to obtain a second transmission opportunity of the first access category according to the first set of contention parameters of the first access category; and
a second transmitter coupled to the second controller and the time-sensitive queue, and when the second transmission opportunity is obtained, if the time-sensitive queue contains the time-sensitive data, configured to generate a second data frame according to the data from the time-sensitive queue, and transmit the second data frame to the another wireless device via the second link.

6. The wireless device of claim 1, wherein when the wireless device determines that data is time-sensitive according to a traffic specification information element (TSPEC IE), the time-sensitive queue is further configured to buffer the time-sensitive data.

7. The wireless device of claim 1, wherein the time-sensitive queue comprises a plurality of sub-time-sensitive queues coupled to the first transmitter; and
when the first transmitter is configured to obtain the first transmission opportunity, if at least one of the plurality of sub-time-sensitive queues contains time-sensitive data, the first data frame is generated according to the time-sensitive data from the at least one of the plurality of sub-time-sensitive queues.

8. The wireless device of claim 1, further comprising a second category queue associated with a second access category and the first link;
wherein the first controller is further coupled to the second category queue, and is configured to compute a first backoff time according to the first set of contention parameters of the first access category, and compute a second backoff time according to a second set of contention parameters of the second access category, and when the first backoff time and the second backoff time expire simultaneously, determine that the first access category has obtained the first transmission opportunity according to a predetermined priority.

9. The wireless device of claim 1, further comprising a first mapping unit coupled to the time-sensitive queue and the first category queue, and configured to receive media access control (MAC) data and a corresponding traffic identifier (TID), and assign the MAC data to the time-sensitive queue or the first category queue according to the corresponding TID.

10. The wireless device of claim 9, wherein the time-sensitive queue comprises a plurality of sub-time-sensitive queues coupled to the first transmitter; and
the first mapping unit is configured to assign the MAC data to one of the first category queue and the plurality of sub-time-sensitive queues according to the corresponding TID.

* * * * *